(No Model.)
L. S. BACHE.
SPLIT PULLEY FRICTION CLUTCH.
No. 515,271. Patented Feb. 20, 1894.
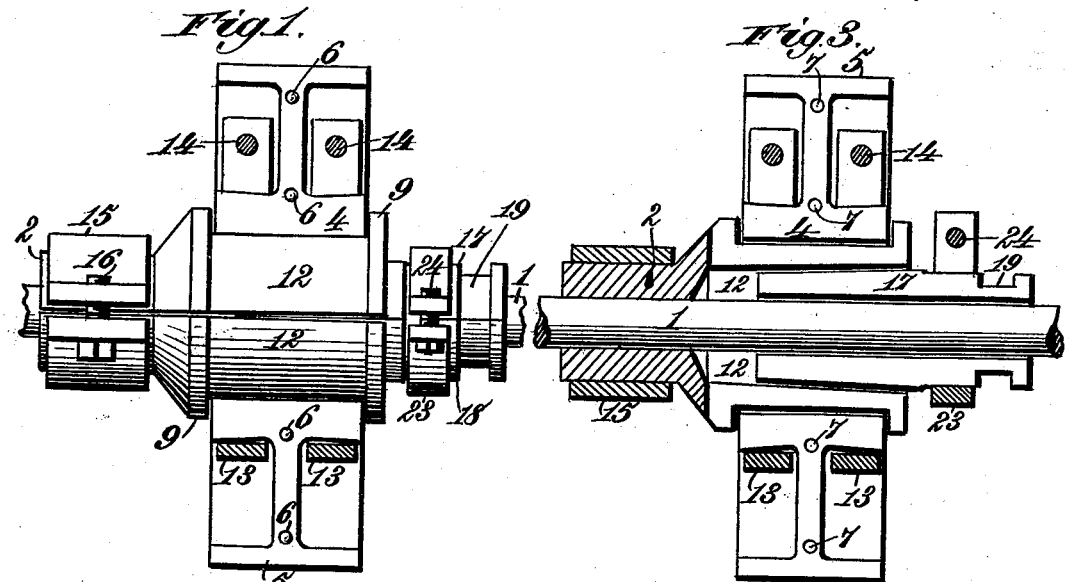
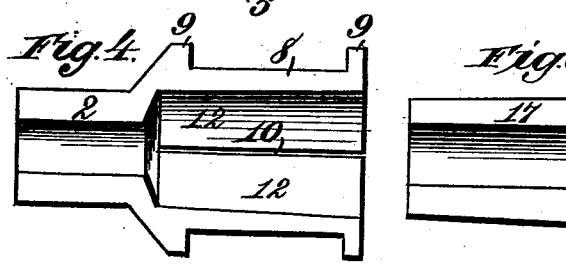
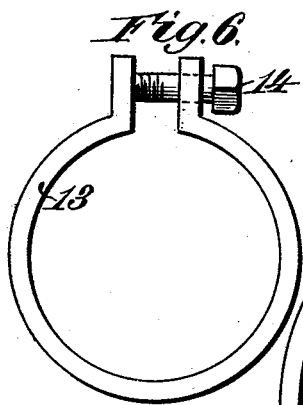
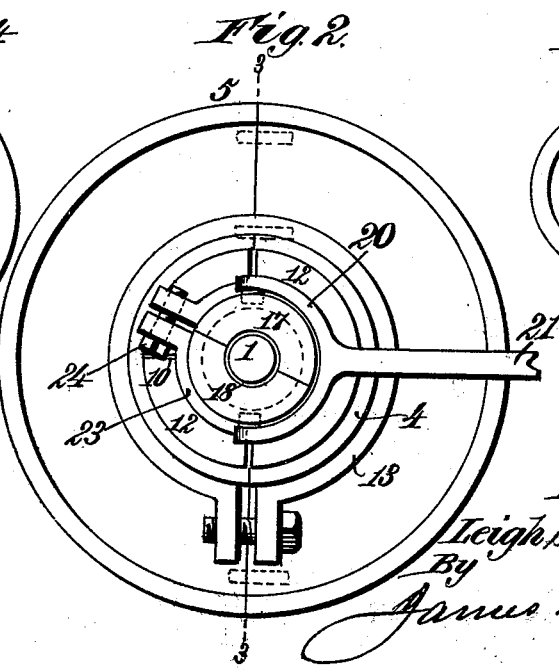
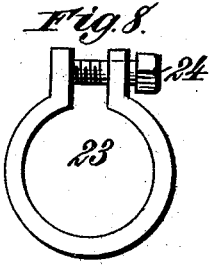
Witnesses.
Robt. Everett.
Thos. A. Green.
Inventor.
Leigh S. Bache.
By James L. Norris.
Atty.
THE NATIONAL LITHOGRAPHING COMPANY,
WASHINGTON, D. C.

UNITED STATES PATENT OFFICE.

LEIGH S. BACHE, OF BOUND BROOK, NEW JERSEY.

SPLIT-PULLEY FRICTION-CLUTCH.

SPECIFICATION forming part of Letters Patent No. 515,271, dated February 20, 1894.

Application filed November 15, 1893. Serial No. 491,002. (No model.)

*To all whom it may concern:*

Be it known that I, LEIGH S. BACHE, a citizen of the United States, residing at Bound Brook, in the county of Somerset and State of New Jersey, have invented new and useful Improvements in Split-Pulley Friction-Clutches, of which the following is a specification.

This invention has for its object to provide a new and improved friction clutch for that type of drive wheels or pulleys which are split or divided to facilitate their application to drive shafts without detaching or removing any part of the shafting.

The invention consists in the features of construction and the combination or arrangement of parts hereinafter described and claimed, reference being made to the accompanying drawings, in which—

Figure 1 is an elevation, omitting one of the halves or sections of the split or divided pulley or wheel. Fig. 2 is a side elevation of the pulley, with the friction clutch in position. Fig. 3 is a sectional view taken on the line 3—3 Fig. 2. Fig. 4 is a detail view of one of the halves or sections of the female part of the clutch. Fig. 5 is a similar view of the male part of the clutch. Fig. 6 is a detail view of one of the clamps for confining the pulley or wheel on the female part of the clutch. Fig. 7 is a similar view of the clamp for confining the female part of the clutch on the drive-shaft; and Fig. 8 is a similar view of the clamp for retaining the male part of the clutch on the drive-shaft.

In order to enable those skilled in the art to make and use my invention, I will now describe the same in detail, referring to the drawings, wherein—

The numeral 1 indicates a drive-shaft, to which is attached the sleeve 2 of the female clutch section which constitutes a bearing for the hub 4 of the drive-wheel or pulley 5. The drive-wheel or pulley is divided diametrically into two sections, one of which is provided with tenons 6 adapted to enter mortises 7 in the other section, whereby the pulley can be quickly and conveniently applied to the cylindrical hub-like portion 8 of the female clutch section. The hub-like portion 8 is provided at its ends with the collars 9, between which the hub 4 of the wheel or pulley is arranged in such manner that the wheel or pulley can rotate upon the hub-like portion 8 of the female clutch section. The female clutch section is divided longitudinally into two similar halves or sections, and each section is provided with a slot or kerf 10 terminating at, or in proximity to the inner portion of the sleeve, whereby each section is provided with two elastic or spring parts or members 12, which can be expanded radially to bind against the internal surface of the hub 4 of the wheel or pulley 5 for causing the wheel or pulley to revolve with the female clutch-section and with the drive-shaft. The sections or parts composing the split or divided wheel or pulley are retained in position upon the hub-like portion 8 of the female clutch-section through the medium of clamping yokes 13 which surround the opposite end portions of the hub 4, and are adapted to be clamped upon the hub of the wheel or pulley through the medium of bolts 14 in such manner as to retain the wheel or pulley upon the hub-like portion 8, the shoulders 9 of which prevent shifting of the wheel or pulley lengthwise of the said hub-like portion 8. The outer surfaces of the hub 4 are so tapered that they incline downwardly from the outer ends of the hub toward the center thereof, so that after the clamping yokes 13 are properly applied they cannot slip off of the hub even if they should become slightly loosened by accidental unscrewing of the bolts 14. The sleeve 2 of the female clutch-section is rigidly clamped upon the drive-shaft 1 through the medium of a clamping yoke 15 which encircles the said sleeve, and is adapted to be tightened through the medium of a bolt 16 for the purpose of clamping the parts or sections of the female clutch-section firmly upon the drive-shaft.

The male clutch-section of the improved friction-clutch is composed of a sleeve divided into two sections 17 and 18, and is provided with an annular groove 19 with which loosely engages the forked part 20 of a clutch lever 21. The sections 17 and 18 of the male clutch-section are provided with an annular bearing 22 in juxtaposition to the annular groove 19, for the purpose of receiving a clamping yoke 23 by which the two sections 17 and 18 can be confined in proper position relatively to each other by tightening up the bolt 24.

In the present example of my invention the clamping yokes 13, 15, and 23 are each composed of a single piece of elastic metal in the form of a ring with the extremities extended outwardly substantially parallel to each other to receive the bolt by which the extremities of the yoke can be drawn together for the purpose of tightening the ring portion of the yoke upon the parts which are to be confined and retained in proper working position. It is obvious, however, that the particular form of the clamping yokes may be materially modified without altering the character of my invention.

The improved construction provides a novel, simple, efficient, and economical friction clutch for a split or divided pulley, and all the parts can be readily and conveniently applied or removed without detaching or taking down any part or parts of the drive-shaft or shafting.

Having thus described my invention, what I claim is—

1. The combination with a wheel or pulley, of an expansible friction clutch section extending through the hub of the wheel or pulley, so that the latter can revolve thereupon and having a bore through which a rotary drive-shaft can extend, means for securing the expansible friction clutch section to said drive-shaft, a friction clutch section movable longitudinally along the shaft for expanding the expansible clutch section against the hub of the wheel or pulley, and a lever for moving the movable friction clutch section on the shaft, substantially as described.

2. The combination of a hollow, longitudinally divided female clutch section through which a rotary drive-shaft can extend, a split or divided wheel or pulley rotatably mounted upon said female clutch section, a divided male clutch section movable longitudinally on the drive-shaft for expanding the female clutch section into engagement with the hub of the wheel or pulley, clamps for clamping the female clutch section to the drive-shaft and for loosely holding the wheel or pulley in position on said female clutch section, and a lever for moving the male clutch section on the drive-shaft, substantially as described.

3. The combination of a hollow, longitudinally divided female clutch section through which a rotary drive-shaft can extend, a split or divided wheel or pulley rotatably mounted upon said female clutch section, a divided male clutch section movable along the said drive shaft into the female clutch section for expanding the latter into engagement with the hub of the wheel or pulley, means for clamping the female clutch section to the drive-shaft and loosely holding the wheel or pulley in position on said female clutch section, means for loosely holding the divided male clutch section on the drive-shaft, and a lever for sliding the male clutch section on the drive-shaft into the female clutch section for expanding the latter against the hub of the wheel or pulley, substantially as described.

4. The combination of a longitudinally divided female clutch-section having elastic portions, a clamp for clamping the female clutch-section on a shaft, a split or divided wheel or pulley held on the female clutch-section, a longitudinally divided male clutch-section adapted to expand the female clutch-section into engagement with the wheel or pulley, and a clamp for retaining the parts of the male clutch-section on the shaft, substantially as described.

In testimony whereof I have hereunto set my hand in presence of two subscribing witnesses.

LEIGH S. BACHE.

Witnesses:
J. E. RUTT,
R. H. BROKAW.